No. 702,327. Patented June 10, 1902.
A. J. OWENS.
PLANTER.
(Application filed Dec. 5, 1901.)
(No Model.) 2 Sheets—Sheet 1.
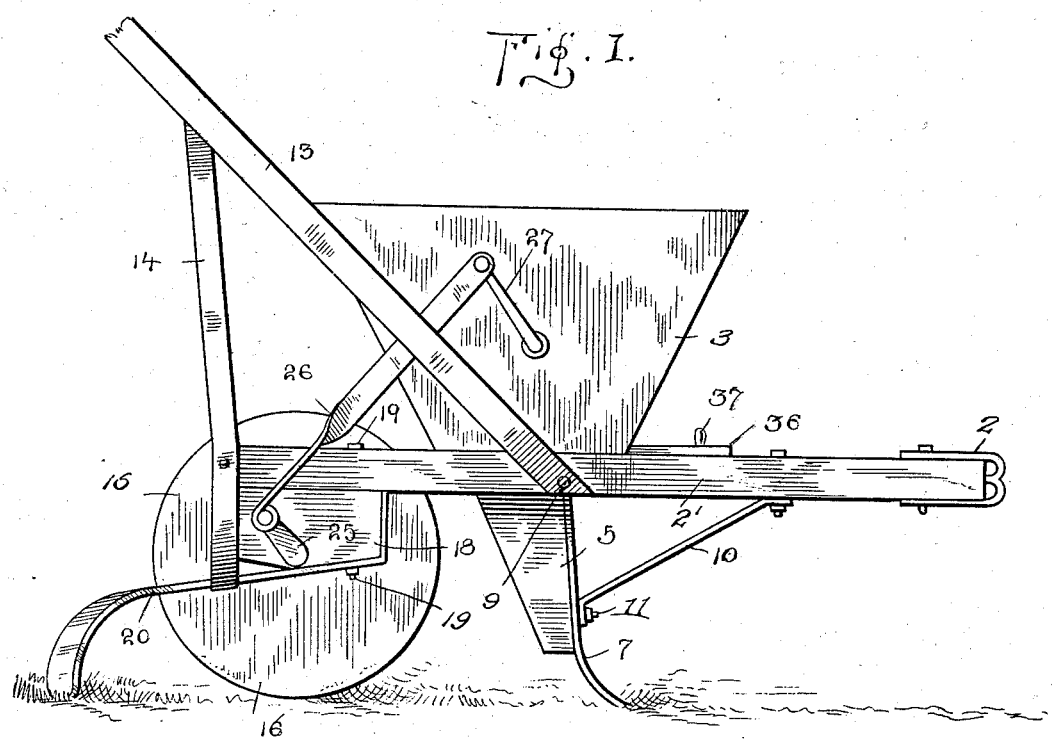
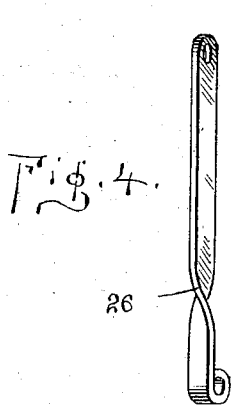
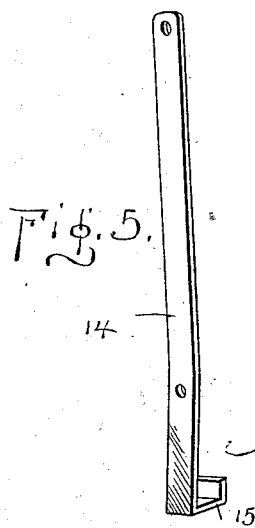
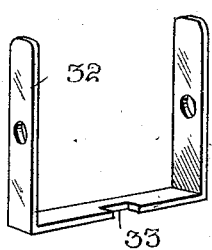
Witnesses
J. W. Riley,
Chas. S. Hyer.
Inventor
A. J. Owens,
By Victor J. Evans
Attorney

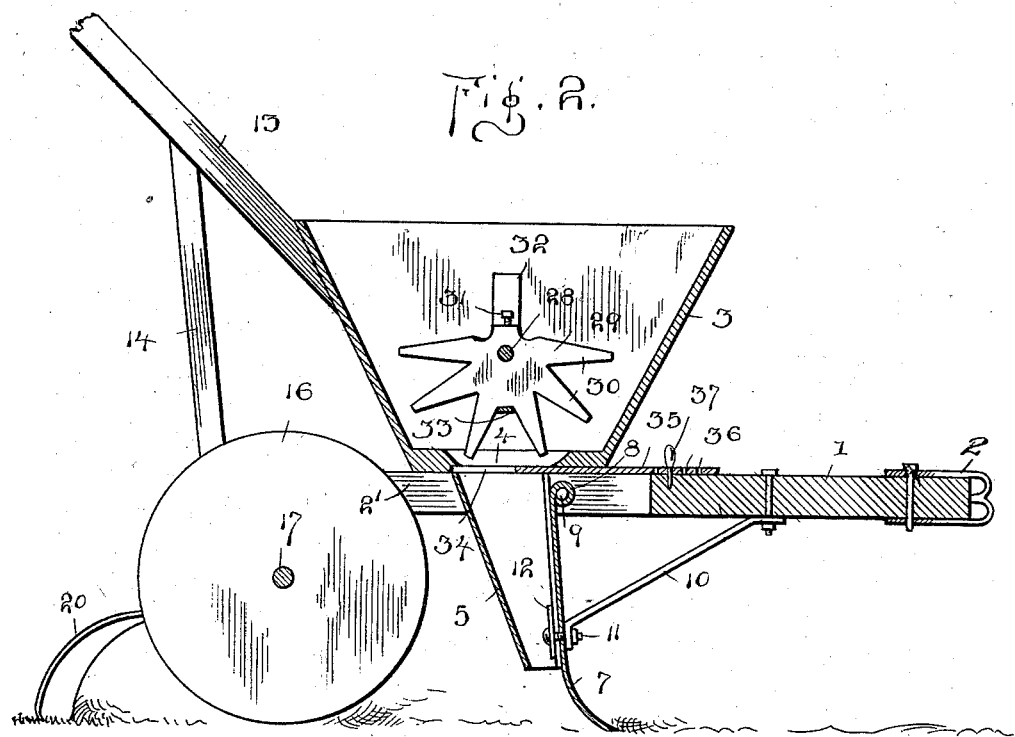

UNITED STATES PATENT OFFICE.

ALBERT J. OWENS, OF CANON, GEORGIA.

PLANTER.

SPECIFICATION forming part of Letters Patent No. 702,327, dated June 10, 1902.

Application filed December 5, 1901. Serial No. 84,830. (No model.)

*To all whom it may concern:*

Be it known that I, ALBERT J. OWENS, a citizen of the United States, residing at and whose post-office address is Canon, in the county of Franklin and State of Georgia, have invented new and useful Improvements in Planters, of which the following is a specification.

This invention relates to improvements in planters, and is more particularly designed as an improvement in planters for cottonseed.

The object of the present invention is to provide a planter which is extremely simple and cheap in construction and one which is light, thereby rendering the planter easy of manipulation; and the invention further aims to provide a planter for sowing the seed in such a manner as to facilitate immediate germination of all sound seed, thereby requiring less amount of seed, less expense in thinning to the desired stand, less draw on the fertility of the soil before the plants are reduced to a desired stand, and also by which an immediate stand of the cotton may be obtained in a comparatively dry soil.

With these general objects in view and others which will appear as the nature of the improvements is better understood, the invention consists, substantially, in the novel construction, combination, and arrangement of parts, as will be hereinafter fully described, illustrated in the accompanying drawings, and pointed out in the appended claims.

In the accompanying drawings, Figure 1 is a side elevation of a cotton-planter constructed in accordance with the present invention. Fig. 2 is a longitudinal sectional view thereof.
Fig. 3 is a top plan view of the planter, the seed-hopper and handles being removed. Fig. 4 is a detail perspective view of the connecting-rod between the shaft of the ground-wheel and the seed-feeder shaft. Fig. 5 is a similar view of one of the handle-braces, and Fig. 6 is also a detail perspective view of the seed-agitator. Fig. 7 is a view of the shaft 17 and the means for securing the wheel thereon.

Referring to the drawings, the numeral 1 designates a draft-beam, to the forward end of which is connected a clevis 2, to which a team may be attached. Arranged at the rear end of the draft-beam 1 and disposed at each side thereof is a pair of rearwardly-extending longitudinally-disposed supporting-beams 2', the rear ends of the beams diverging to provide a comparatively wide space therebetween. Arranged above the beams 2' is a seed-hopper 3, the latter being provided at its bottom with an opening 4, and registering with the opening 4 and located between the supporting-beams 2' is a conveyer-spout 5. The latter tapers from its upper end to its lower end and is provided at its forward side with inwardly-extending flanges 6. Arranged in advance of the conveyer-spout 5 is a plow-foot 7, the latter being provided at its upper end with a loop 8, through which is passed a transversely-extending supporting-rod 9. It will thus be seen that the plow-foot 7 is held in suspended position from the rod 9; but in order that said foot may be held in rigid relation to the beams 2' a brace 10 is employed, said brace being connected to the foot 7 through the medium of a bolt 11 and likewise connected to the under side of the draft-beam 1. The bolt 11 passes through the slot formed between the flanges 6, and mounted upon said bolt is a clamping-plate 12, which bears against the inner sides of the flanges 6, and through the medium of the plate 12 it will be seen that the spout 5 is held in fixed relation to the plow 7, the upper end of the spout 5 fitting between the beams 2' and being prevented thereby moving in a transverse manner.

Connected to the outer sides of the supporting-beams 2' is a pair of rearwardly-extending handles 13, the lower ends of said handles being fixed to the beams 2' by means of the bolt 9, and also connected to the handles 13 and extending downwardly therefrom is a pair of vertically-arranged braces 14, said braces being connected to the rear ends of the beams 2' in any suitable manner. The lower ends, however, of the braces 14 are provided with inwardly-extending supporting-feet 15, the purpose of said feet being set forth more fully hereinafter.

Journaled between the rear ends of the supporting-beams 2' is a ground-wheel 16, the latter being provided with a transversely-extending shaft 17, and the ends of said shaft are journaled in suitable bearing-blocks 18, carried at the under side of the rear ends of the beams 2'. The bearing-blocks 18 are secured to the beams 2' through the medium of bolts 19, and the under sides of said blocks are beveled in opposite directions, as clearly shown. Arranged at the under side of each of the blocks 18 is a covering-tooth 20, the latter being connected to the blocks 18 through the medium of the bolts 19, and said teeth are arranged within and supported to limit their downward movement by the feet 15 of the braces 14. It will thus be seen that the teeth 20 are capable of moving in a vertical direction when inequalities in the ground are encountered, and by reason of the under sides of the blocks 18 being beveled in reverse directions it will also be seen that such upward movement is greatly facilitated. The shaft 17 is provided at a point intermediate its ends with a fixed flange 21, which flange is provided with inwardly-extending engaging points 22, adapted to enter the adjacent side of the wheel 16, and mounted upon the shaft 17, at the opposite sides of the wheel 16, is a movable flange 23, held in close contact with the wheel 16 through the medium of a securing-pin 24. By reason of this construction it is obvious that as the wheel 16 rotates the shaft 17 will move therewith, the engaging point 22 of the flange 21 insuring such movement of the shaft 17. Secured at one end of the shaft 17 is a crank 25, and connected to said crank is a pitman 26, the latter being twisted at a point intermediate its ends and having its upper end connected to a crank 27, formed on a rock-shaft 28, journaled in the sides of the seed-hopper 3. As the crank 25 rotates, the latter being shorter than the crank 27, the latter will be oscillated, and the shaft 28 will thereby be rocked in unison with the rotation of crank 25.

Mounted upon the shaft 28 within the hopper 3 is a seed-feeder 29, the latter being provided with a series of radially-arranged arms 30, and said feeder is secured to the shaft 28 through the medium of a set-screw 31. The ends of the arms 30 are adapted to extend into the opening 4, and by reason of such position of said arms it will be seen that the seed are readily fed into said opening. Also mounted upon the shaft 28 is a U-shaped agitator 32, the vertical arms of which contact with the sides of the hopper 3, and thereby prevent lateral movement of the shaft 28. The horizontal arm of the agitator 32 fits between two of the arms 30, and one edge of said horizontal arm is provided with a notch 33 for receiving the contiguous feeder-arm 30. The agitator 32 is thereby held in fixed relation to the feeder 29 and is prevented rotating on the shaft 28.

The bottom of the hopper 3 is grooved, as at 34, and fitting within said groove is a longitudinally-disposed feed-regulator 35, whereby the size of the opening 34 may vary according to the amount of seed which it is desired to deposit in the spout 5, and for effecting adjustment of the regulator 35 the latter is provided at its forward end with a series of perforations 36, in one of which is arranged an adjusting-pin 37. If desired, the perforations 36 may be dispensed with and an elongated slot and screw substituted for the same and the pin 37.

With the parts assembled in the manner herein shown and described the operation of the machine is as follows: The regulator 35 having been adjusted to the desired position and a team having been hitched to the planter, it will be seen that as the latter is drawn forwardly the wheel 16 is caused to rotate, and it will be observed at this point that the tread of this wheel is comparatively wide in order to pack the ground in rear of the feed-spout 5. As the wheel 16 rotates the feeder 29 is oscillated within the hopper 3 through the pitman 26, and through the medium of the arms 30 the seed within said hopper are fed into the spout 5. The plow 7, working in advance of said spout, opens a furrow, and as the seed are dropped therein the ground is covered over the same as the wheel 16 advances. With the forward movement of the machine it is also obvious that the covering-teeth 20 form ridges of the size of the furrow, and the complete covering of the seed is effected thereby. If at any time during the movement of the planter inequalities in the ground are encountered, the resilient nature of the teeth 20 permit the latter to yield upwardly, and after passing such inequalities the same resume their normal position within the supporting-feet 15. During the oscillation of the feeder 29 the agitator 32 is also oscillated, and through the medium of the same the seed are prevented becoming choked or clogged within the hopper.

Having thus fully described my invention, what I claim as new, and desire to secure by Letters Patent, is—

1. In a planter of the character described, the combination with a supporting-frame, of blocks secured thereto and having their under sides oppositely beveled, and covering-teeth secured to the blocks to permit their free ends to have vertical movements.

2. In a planter of the character described, the combination with a supporting-frame, of blocks secured thereto and having their sides oppositely beveled, covering-teeth secured to the blocks to permit their free ends to have vertical movements, and means for limiting the downward movements of the covering-teeth.

3. In a planter of the character described, the combination with a supporting-frame, of blocks secured thereto, covering-teeth secured to the blocks to permit their free ends to have vertical movements, and braces secured to the frame and provided with supporting-feet to receive the covering-teeth limiting their downward movements.

4. In a planter of the character described, the combination with a supporting-frame, of blocks secured thereto, covering-teeth secured to the blocks to permit their free ends to have vertical movements, handles secured to the supporting-frame, and braces having their upper ends secured to the handles, and their lower ends provided with supporting-feet to receive the covering-teeth limiting their downward movements.

5. In a planter of the class described, the combination with a supporting-frame, of a plow-foot depending therefrom, a feed-spout provided with a pair of inwardly-extending flanges, a clamping-plate engaging said flanges, a bolt carried by the plow-foot for holding said clamping-plate, feed-spout and plow-foot together, blocks secured to the supporting-frame, and covering-blades secured to the block to permit their free ends to have vertical movements.

6. In a planter of the class described, the combination with a supporting-frame, of a plow-foot carried thereby and depending therefrom, a feed-spout carried by the plow-foot, a seed-hopper carried by the frame, a feeder arranged within said hopper, a U-shaped agitator carried by the feeder, blocks secured to the frame, and covering-teeth secured to the blocks to permit their free ends to have vertical movements.

7. In a planter of the class described, the combination with a supporting-frame, of a plow-foot carried thereby and depending therefrom, a feed-spout provided with a pair of inwardly-extending flanges, a clamping-plate engaging said flanges, a bolt carried by the plow-foot for holding said clamping-plate, feed-spout, and plow-foot together, a seed-hopper carried by the frame, a feeder arranged within the hopper, a U-shaped agitator carried by the feeder, a regulator interposed between the seed-hopper and the feed-spout, bearing-blocks secured to the supporting-frame, and having their under sides oppositely beveled, a shaft journaled on the bearing-blocks, a wheel mounted on the shaft, means for imparting motion to the seed-feeder, handles secured to the supporting-frame, covering-teeth secured to the bearing-blocks to permit their free ends to have vertical movements, and braces carried by the supporting-frame and connected to the handles, the braces being provided at their lower ends with supporting-feet to receive the covering-teeth limiting their downward movements.

In testimony whereof I affix my signature in presence of two witnesses.

ALBERT J. OWENS.

Witnesses:
 T. G. DOROUGH,
 D. A. BAKER.